United States Patent
Morimura

(10) Patent No.: US 9,873,173 B2
(45) Date of Patent: Jan. 23, 2018

(54) CUTTING FLUID TANK

(71) Applicant: OKUMA CORPORATION, Niwa-gun (JP)

(72) Inventor: Shoichi Morimura, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 0 days.

(21) Appl. No.: 14/976,616

(22) Filed: Dec. 21, 2015

(65) Prior Publication Data

US 2016/0184950 A1    Jun. 30, 2016

(30) Foreign Application Priority Data

Dec. 25, 2014   (JP) .................. 2014-263097

(51) Int. Cl.
| | |
|---|---|
| *B23Q 11/10* | (2006.01) |
| *B23Q 11/00* | (2006.01) |
| *B23B 27/10* | (2006.01) |
| *B24B 55/02* | (2006.01) |
| *B24B 55/03* | (2006.01) |

(52) U.S. Cl.
CPC .......... *B23Q 11/1069* (2013.01); *B23B 27/10* (2013.01); *B23Q 11/0042* (2013.01); *B23Q 11/0057* (2013.01); *B24B 55/02* (2013.01); *B24B 55/03* (2013.01); *B23B 2250/12* (2013.01); *Y10T 137/86196* (2015.04); *Y10T 137/86204* (2015.04); *Y10T 137/86212* (2015.04); *Y10T 137/86228* (2015.04)

(58) Field of Classification Search
CPC ..... Y10T 137/86228; Y10T 137/86212; Y10T 137/86196; Y10T 137/86204; B23Q 11/1069; B23Q 11/0057; B23B 2250/12; B23B 27/10; B24B 55/02; B24B 55/03
See application file for complete search history.

(56) References Cited

U.S. PATENT DOCUMENTS

| | | | | |
|---|---|---|---|---|
| 2,919,029 | A | * | 12/1959 | Smith ................ B23Q 11/1069 210/299 |
| 5,454,937 | A | * | 10/1995 | Lewandowski .... B01D 17/0211 210/104 |
| 5,738,782 | A | * | 4/1998 | Schafer ................ B01D 21/12 210/171 |
| 6,015,487 | A | * | 1/2000 | Mori ..................... B01D 37/00 184/6.24 |

(Continued)

FOREIGN PATENT DOCUMENTS

| | | |
|---|---|---|
| JP | 02-106248 A | 4/1990 |
| JP | 04-042350 U | 4/1992 |

(Continued)

*Primary Examiner* — Atif Chaudry
(74) *Attorney, Agent, or Firm* — Locke Lord LLP

(57) ABSTRACT

A cutting fluid tank includes a variable flow restricting device configured to restrict a flow of cutting fluid containing chips into an interior of a tank body configured to store the cutting fluid containing the chips flowed from a work portion of a machine tool. The variable flow restricting device includes variable partitioning members which constitute at least part of a partitioning that partitions a flow channel of the cutting fluid containing the chips. The variable partitioning member is pivotably and the flow channel varies in association with the pivotal motion of the variable partitioning member.

11 Claims, 6 Drawing Sheets

(56) References Cited

U.S. PATENT DOCUMENTS

| | | | | |
|---|---|---|---|---|
| 6,096,198 A | * | 8/2000 | Underhill | B01D 17/0202 210/123 |
| 6,125,883 A | * | 10/2000 | Creps | B23Q 11/1069 137/362 |
| 6,571,959 B1 | * | 6/2003 | Moore | B01D 33/15 210/167.09 |
| 2014/0291228 A1 | * | 10/2014 | Ishihara | B23Q 11/1069 210/257.1 |

FOREIGN PATENT DOCUMENTS

| | | |
|---|---|---|
| JP | 06-042045 U | 6/1994 |
| JP | 07-007855 U | 2/1995 |
| JP | 2004-114221 A | 4/2004 |

\* cited by examiner

CUTTING FLUID TANK

BACKGROUND OF THE INVENTION

1. Field of the Invention

The present invention relates to a cutting fluid tank used for a machine tool such as a machining center and a turning machine.

In this specification, by "front" is meant an upper side in FIGS. 1 to 11, by "rear" is meant a lower side in FIGS. 1 to 11, and by "left and right" is meant the left and the right in FIGS. 1 to 11.

2. Description of the Background Art

For example, in a machine tool configured to perform a cutting work such as a machining center and a turning machine, cutting fluid is generally used for a purpose of lubrication and cooling of tools and discharge of chips.

The cutting fluid discharged toward a work chamber of the machine tool by a cutting fluid supply pump is discharged to outside the work chamber together with chips scraped out from the work. The discharged cutting fluid flows into a tank body of a cutting fluid tank and stores temporarily after the chips mixed therein have been separated and removed by a chip conveyor or a filter, and is supplied therefrom to the work chamber again by the cutting fluid supply pump. However, the chips mixed in the cutting fluid cannot be separated and removed by 100% depending on the chip conveyor or the filter, and some quantity of chips flow into the tank body of the cutting fluid tank together with the cutting fluid. However, if the chips entered the tank body are sucked into devices such as the cutting fluid supply pump, the devices may be damaged or may break down.

In addition, the chips flowed together with the cutting fluid are gradually accumulated in the tank body, whereby an effective capacity of the tank body, that is, a capacity for storing the cutting fluid itself is reduced. Therefore, when a large quantity of the cutting fluid is supplied toward the work chamber, a problem of exhaustion of the cutting fluid in the interior of the tank body may arise.

In addition, the chips are settled and accumulated on a bottom portion of the tank body, the state and the quantity of accumulation are difficult to figure out at first glance and a lot of time and effort are required for removing the accumulated chips.

Accordingly, installing a chip separating apparatus such as a centrifuge or a magnet separator in a predetermined position in the interior of the tank body and separating and removing the chips from the cutting fluid are performed.

However, the chips contained in the cutting fluid are spread over the entire area of the tank body, and is settled and accumulated on the bottom portion thereof. Therefore, even though an attempt is made to collect the chips by the chip separating apparatus, only part of the chips existing in a peripheral area of the apparatus. Therefore, the chips accumulated in other areas in the tank body cannot be collected.

If a flow of the cutting fluid in the interior of the tank body is fast, since the chips mixed in the cutting fluid move with the flow of the cutting fluid, accumulation of the chips on the bottom portion of the tank body may be prevented or alleviated. However, since the quantity of the cutting fluid flowing in the tank body varies in accordance with the quantity of the cutting fluid required for machining of the work, there are cases where a flow rate is not stable and becomes slow or where the flow is stopped.

In addition, the tank body of the cutting fluid tank is required to secure a maximum capacity with respect to an installation space, and in addition, the devices such as the chip conveyor are disposed in many cases, a structure or a shape is subject to various restraints. Therefore, a narrow portion which is complex and indented portions are formed in the interior of the tank body. Consequently, there arises a problem that the cutting fluid containing the chips stays in such portions and thus the chips are accumulated on the bottom portion.

The problem described above will be described specifically. In the cutting fluid tank, the cutting fluid containing the chips flows as a whole from an inflow position into the interior of the tank body toward a cutting fluid supply device for supplying the cutting fluid to a work portion of the machine tool. However, due to the structure of the interior of the tank body, there may arise points where the flowing velocity is high and points where the flowing velocity is low. Depending on the structure of the interior of the tank body, a plurality of flow channels may be formed into a branched manner from the inflow position toward the cutting fluid supply device. In such a case as well, an average flowing velocity of the cutting fluid is lowered in the tank body as a whole, and thus the state of being susceptible to accumulation of the chips occurs.

FIG. 10 illustrates an example of the cutting fluid tank of the related art.

An illustrated cutting fluid tank (101) is provided with a tank body (2) having a rather laterally elongated box-shape when in plan view.

A chip conveyor (3) elongated in a fore-and-aft direction is installed at a center portion in the interior of the tank body (2). The chip conveyor (3) is arranged below the work chamber of the machine tool, which is not illustrated.

Cutting fluid discharged from the work chamber and chips mixed therein flow into the interior of the tank body (2) from flow-out ports (31) opening at a rear end portion of both left and right side surfaces of the chip conveyor (3) after part of the chips have been separated and removed in the chip conveyor (3).

In the interior of the tank body (2), a right partitioning wall (25) extending in the fore-and-aft direction so as to partition a portion between the chip conveyor (3) and a right side wall (21) into left and right two parts and a left partitioning wall (26) extending in the fore-and-aft direction so as to partition a portion between the chip conveyor (3) and a left side wall (22) into left and right two parts.

Spaces are formed between a front end of the right partitioning wall (25) and a front side wall (23) and between a rear end of the right partitioning wall (25) and a rear side wall (24). A space is also formed between a front end of the left partitioning wall (26) and the front side wall (23). A rear end of the left partitioning wall (22) is connected to the rear side wall (24).

With the configuration described above, the interior of the tank body (2) is partitioned into a right inner area (2a) between the chip conveyor (3) and the right partitioning wall (25), a right outer area (2b) between the right partitioning wall (25) and the right side wall (21), a left inner area (2c) between the chip conveyor (3) and the left partitioning wall (26), and a left outer area (2d) between the left partitioning wall (26) and the left side wall (22), and front ends of the right inner area (2a), the right outer area (2b), the left inner area (2c), and the left outer area (2d) communicate with each other via a front area (2e) along the front side wall (23), and rear ends of the right inner area (2a), the right outer area (2b), and the left inner area (2c) communicate with each other via a rear area (2f) along the rear side wall (24).

A cutting fluid supply pump (4) configured to pump up cutting fluid in the interior of the tank body (2) and feed the cutting fluid to the work chamber of the machine tool is provided at a rear end portion of the left outer area (2d) in the interior of the tank body (2).

A chip separating apparatus (51) composed of a centrifuge, a magnet separator, or the like and a filter (52) are provided in the left outer area (2d) in the interior of the tank body (2) in proximity to the cutting fluid supply pump (4) on a front side (upstream side) thereof.

In the cutting fluid tank (101) described above, cutting fluid containing the chips flowed into the interior of the tank body (2) from left and right flow-out ports (31) of the chip conveyor (3) flows toward the cutting fluid supply pump (4). However, major part thereof flows through the right inner area (2a), the left inner area (2c), the front area (2e), and the left outer area (2d) as indicated by thick lines (C) with an arrow in FIG. 10. Therefore, since the flow velocity of the cutting fluid containing the chips may become extremely slow or may even be held up specifically in the rear area (2f) or in the right outer area (2b), chips (T) tend to accumulate on the bottom portion.

FIG. 11 illustrates other example of the cutting fluid tank of the related art.

In a cutting fluid tank (102) of FIG. 11, a flow channel of cutting fluid containing chips is formed along a one corner portion in a tank body (20). Specifically, a right partitioning wall (203) parallel to a right side wall (201) and a rear partitioning wall (204) parallel to a rear side wall (202) are provided so as to be orthogonal to each other in a right rear corner portion where the right side wall (201) and the rear side wall (202) intersects in the interior of the tank body (20), so that the flow channel bent at a right angle by these four walls (201), (202), (203), and (204) is formed.

In the flow channel described above, since a flow (C) of the cutting fluid changes the direction significantly, a point where the flowing velocity is partly low tends to arise. In other words, at a corner portion between the right side wall (201) and the rear side wall (202) and at a portion along the right partitioning wall (203), the flow of the cutting fluid tends to be held, so that the chips may accumulate on the bottom portion of such a point.

In the related art, several devices configured to prevent the chips from accumulating in the tank body of the cutting fluid tank are proposed.

For example, a cutting fluid tank described in JP-UM-A-6-42045 includes in a tank body: a central separating plate configured to partition the interior thereof into a front part and a rear part, a chip trapping pocket located at one corner portion, and two front and rear movable plates movable along both sides of the central separating plate along the central separating plate. Each of the movable plate includes a nozzle configured to eject cutting fluid so as to form a circulating flow of the cutting fluid in the interior of the tank body, and a scraping plate configured to scrape chips accumulated on a bottom portion of the tank body.

JP-UM-A-4-42350 discloses a cutting fluid tank configured to eject the cutting fluid pumped up from the interior of the tank body through the nozzle so as to run along a wall surface of the tank body to form an eddy current in cutting fluid in the interior of the tank body, so that chips are prevented from accumulating on a bottom portion of the tank body. JP-UM-A-7-7855 discloses a cutting fluid tank having the same configuration as JP-UM-A-4-42350. However, in the cutting fluid tank of this disclosure, chips collected at a center portion of a tank body by an eddy current are pumped up with a pump with cutting fluid, and causes the pumped cutting fluid containing the chips to pass through a filter and to be returned again to the tank body.

In JP-A-2004-114221 and JP-A-2-106248, installing a screw for stirring cutting fluid in an interior of a tank body of a cutting fluid tank to prevent chips from accumulating on a bottom portion of the bank body is disclosed.

SUMMARY OF THE INVENTION

However, the cutting fluid tank disclosed in JP-UM-A-6-42045 is limited to that having the tank body with a simple internal structure and cannot be applied to a case where, for example, the chip conveyor or the like is installed and complex and indented portions are formed or in the case where the flow channel of the cutting fluid containing the chips is branched into a plurality of channels.

In the case of the devices configured to form an eddy current of the cutting fluid in the interior of the tank body like the cutting fluid tanks disclosed in JP-UM-A-4-42350 and JP-UM-A-7-7855, if the chip conveyor or the like is installed in the interior of the tank body, a flow is impaired thereby and, in addition, the flow of the cutting fluid may become constant. Therefore, a portion having a potential to allow the chips to accumulate therein may be formed.

Moreover, in the case where the screw is used like the cutting fluid tank as disclosed in JP-A-2004-114221 and JP-A-2-106248, the effect is limited to a certain range of the tank body, and the chips cannot be prevented from accumulating in a wide range in the interior of the tank body effectively.

It is an object of the invention to provide a cutting fluid tank configured to effectively prevent accumulation of chips into an interior of a tank body, and hence requires less burden of maintenance such as cleaning, and has an ability to maintain an effective capacity of the tank body.

In order to achieve the above-described object, embodiments of the invention are configured as follows.

1) A cutting fluid tank including a variable flow restricting device configured to restrict a flow of cutting fluid containing chips and to be capable of varying at least one of a direction and a position with time in the interior of a tank body configured to store the cutting fluid containing the chips flowed from a work portion of a machine tool.

2) The cutting fluid tank of 1) described above, wherein the variable flow restricting device includes a variable partitioning member that constitutes at least part of partitioning which defines a flow channel of the cutting fluid containing the chips in the interior of the tank body, and is capable of varying at least one of the direction and the position with time.

3) The cutting fluid tank of 2) described above, wherein the variable partitioning member is configured to be capable of pivoting or swinging, and the flow channel of the cutting fluid containing the chips is varied in association with the pivoting or the swinging of the variable partitioning member.

4) The cutting fluid tank of 2) described above, wherein the variable partitioning member is capable of performing reciprocatory motion in a predetermined direction, and the flow channel of the cutting fluid containing the chips is varied in association with the reciprocatory motion of the variable partitioning member.

5) The cutting fluid tank of 2) descried above, wherein the variable partitioning member is elastically deformable by being formed at least partly of an elastic member, and the flow channel of the cutting fluid containing the chips is varied in association with the elastic deformation and restoration of the elastic member.

6) The cutting fluid tank of 1) described above, wherein the variable flow restricting device includes a variable flow introducing member that introduces the flow of the cutting fluid containing the chips in the interior of the tank body, and is capable of varying at least one of the direction and the position with time.

7) The cutting fluid tank of 6) described above, wherein the variable flow introducing member is provided at a corner portion in the interior of the cutting fluid tank.

8) The cutting fluid tank of 6) or 7) described above, wherein the variable flow introducing member is configured to be capable of pivoting or swinging, and the direction of flow of the cutting fluid containing the chips is varied in association with the pivoting or the swinging of the variable flow introducing member.

9) The cutting fluid tank of any one of 1) to 8) described above, wherein the variation of at least one of the direction and the position of the variable flow restricting device is performed continuously or intermittently during the operation of the machine tool.

10) The cutting fluid tank of any one of 1) to 9) described above, wherein the variation of at least one of the direction and the position of the variable flow restricting device is performed by a drive force of a hydraulic motor configured to be operated by a flowing force of the cutting fluid supplied from the tank body to the work portion by a cutting fluid supply device.

According to the cutting fluid tank of 1) described above, by varying at least one of the direction and the position of the variable flow restricting device provided in the interior of the tank body with time, the flow of the cutting fluid containing the chips is varied with time. Therefore, the chips in the interior of the tank body are fed downstream with the flow of the cutting fluid without being accumulated at a point where the flowing velocity is low. Therefore, by providing, for example, a chip separating device including a centrifuge or a magnet separator to the work chamber on the downstream side in the interior of the tank body, more preferably, in the vicinity of the cutting fluid supply device, chips contained in the cutting fluid can be separated and removed by the chip separating device.

Therefore, according to the cutting fluid tank of 1) described above, since accumulation of the chips in the interior of the tank body can be prevented effectively in comparison with the related art, a burden of maintenance such as cleaning is reduced, and a desired quantity of cutting fluid may be stably supplied to the machine tool while maintaining an effective capacity of the tank body.

According to the cutting fluid tank of 2) described above, since the flow channel of the cutting fluid containing the chips may be varied by varying the direction and/or the position of the variable partitioning member, even though a plurality of the flow channels are formed in a branched manner in the interior of the tank body, for example, accumulation of the chips due to lowering or holding down of the flow velocity of the cutting fluid is effectively prevented.

According to the cutting fluid tank of 3) described above, since the variable partitioning member is of a pivoting type or a swinging type, the structure of the same member and the mechanism for driving the same may be simplified, and thus a reduction of cost is achieved.

According to the cutting fluid tank of 4) described above, the variable partitioning member, being of a reciprocatory motion type, may be relatively easily applied to complex switching of the flow channel, and in addition, the structure of the same member and the mechanism for driving the same may be simplified, and thus a reduction of cost is achieved.

According to the cutting fluid tank of 5) described above, since the variable partitioning member is of an elastic deformation type formed at least partly of a rubber elastic member, the structure is simple and thus a reduction of cost is achieved. In addition, variations in direction and position may also be easily achieved.

According to the cutting fluid tank of 6) described above, since the direction of flow of the cutting fluid containing chips may be varied by varying the direction and/or the position of the variable flow introducing member, by installing the same member at a position in the interior of the tank body where the cutting fluid tends to stay, accumulation of the chips in the position is effectively prevented.

According to the cutting fluid tank of 7) described above, accumulation of chips is effectively prevented by the variable flow introducing member in the corner portion in the interior of the tank body where the cutting fluid tends to stay locally.

The term "corner portion" includes not only the one formed by adjacent outer walls of the tank body, but also the one formed by the outer wall and the partitioning wall in the interior of the tank body and that by formed between adjacent partitioning walls.

According to the cutting fluid tank of 8) described above, since the variable flow introducing member is of a pivoting type or a swinging type, the structure of the same member and the mechanism for driving the same may be simplified, and thus a reduction of cost is achieved.

According to the cutting fluid tank of 9) described above, since variation in direction and/or position of the variable flow restricting device is performed continuously or intermittently during the operation of the machine tool, prevention of accumulation of the chips by the variable flow restricting device is efficiently achieved.

The cutting fluid tank of 10) described above is cost efficient because the variation of the direction and the position of the variable flow restricting device is performed by a drive force of a hydraulic motor configured to be operated by a flowing force of the cutting fluid supplied from the tank body to the work portion, and thus effective usage of energy is achieved.

DETAILED DESCRIPTION OF THE INVENTION

Subsequently, embodiments of the invention will be described with reference to FIG. 1 to FIG. 9.

First Embodiment

Figure 1:
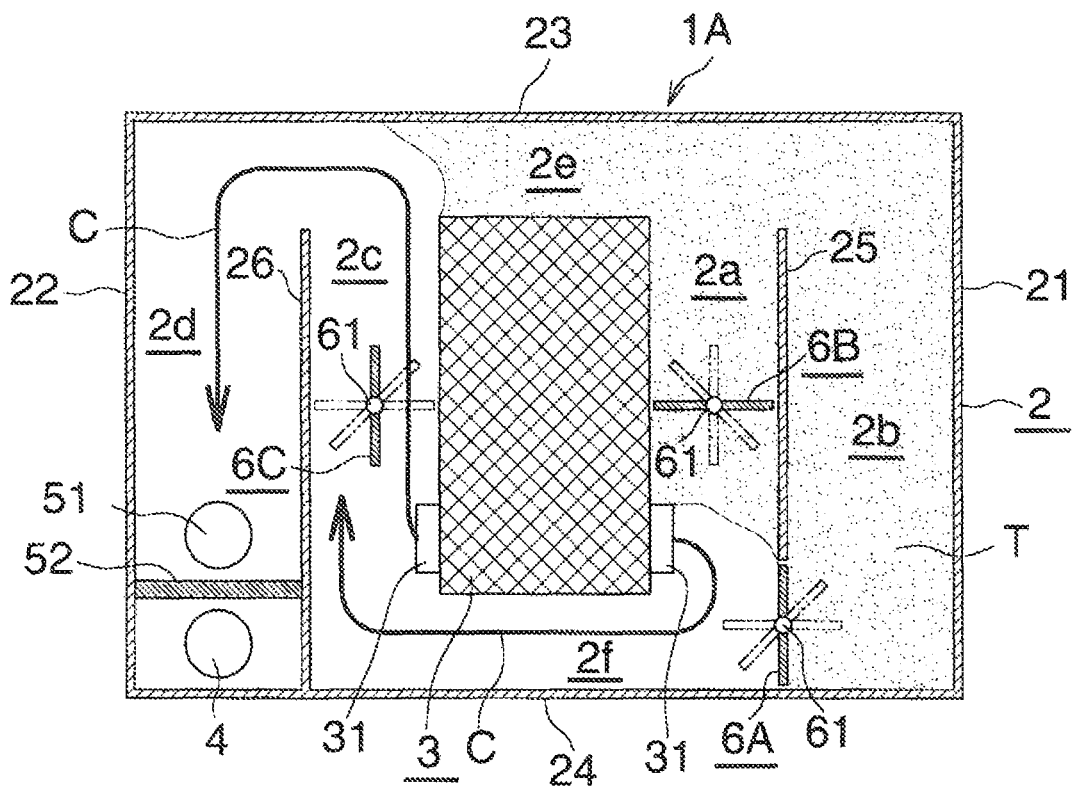
FIG. 1 is a horizontal cross-sectional view illustrating a first mode of a cutting fluid tank of a first embodiment of the invention.
Figure 2:
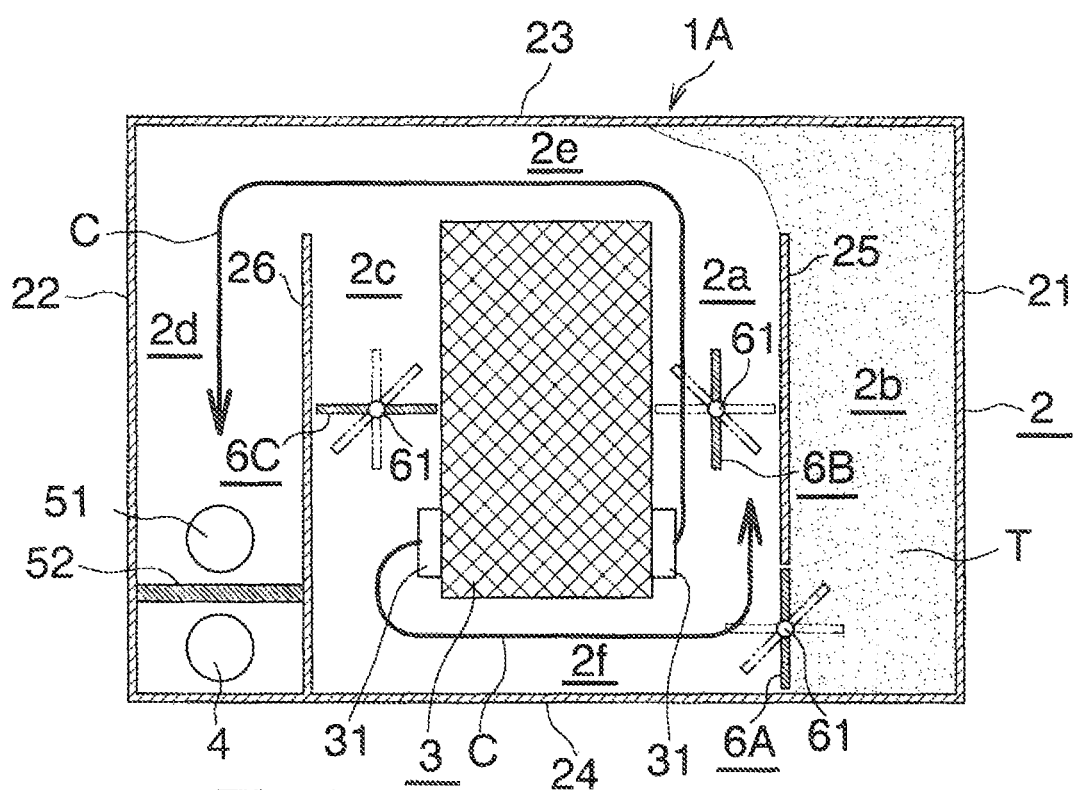
FIG. 2 is a horizontal cross-sectional view illustrating a second mode of the cutting fluid tank.
Figure 3:
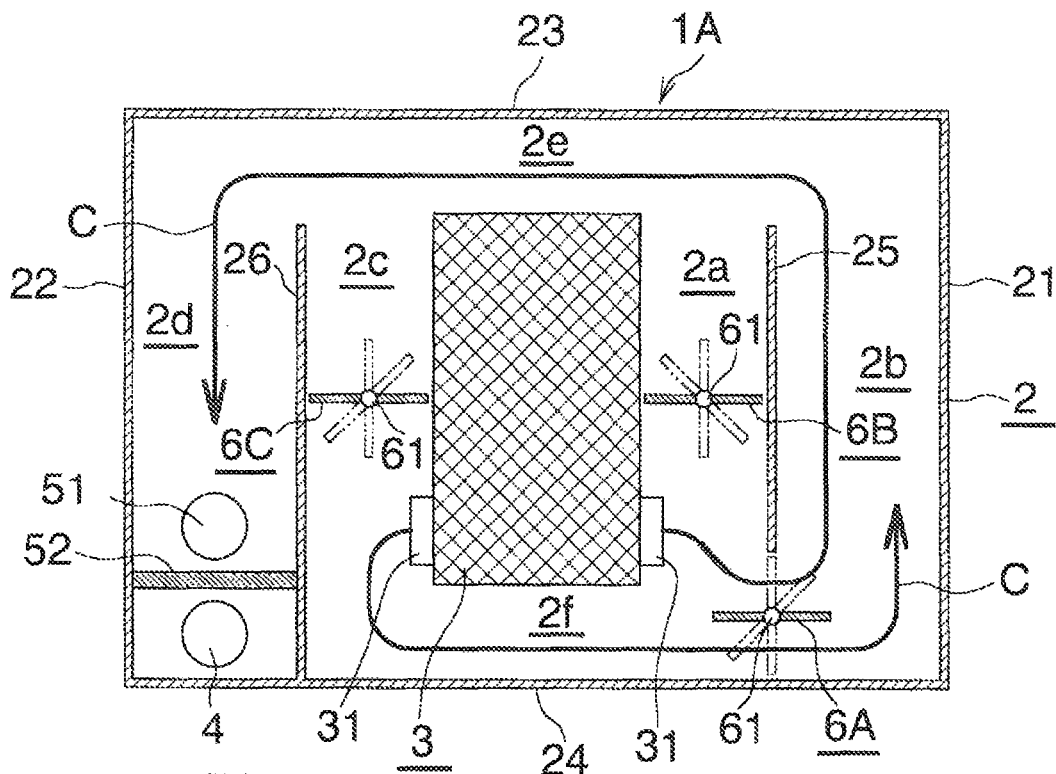
FIG. 3 is a horizontal cross-sectional view illustrating a third mode of the cutting fluid tank.

FIG. 1 to FIG. 3 illustrate a first embodiment of the invention.

Figure 10:
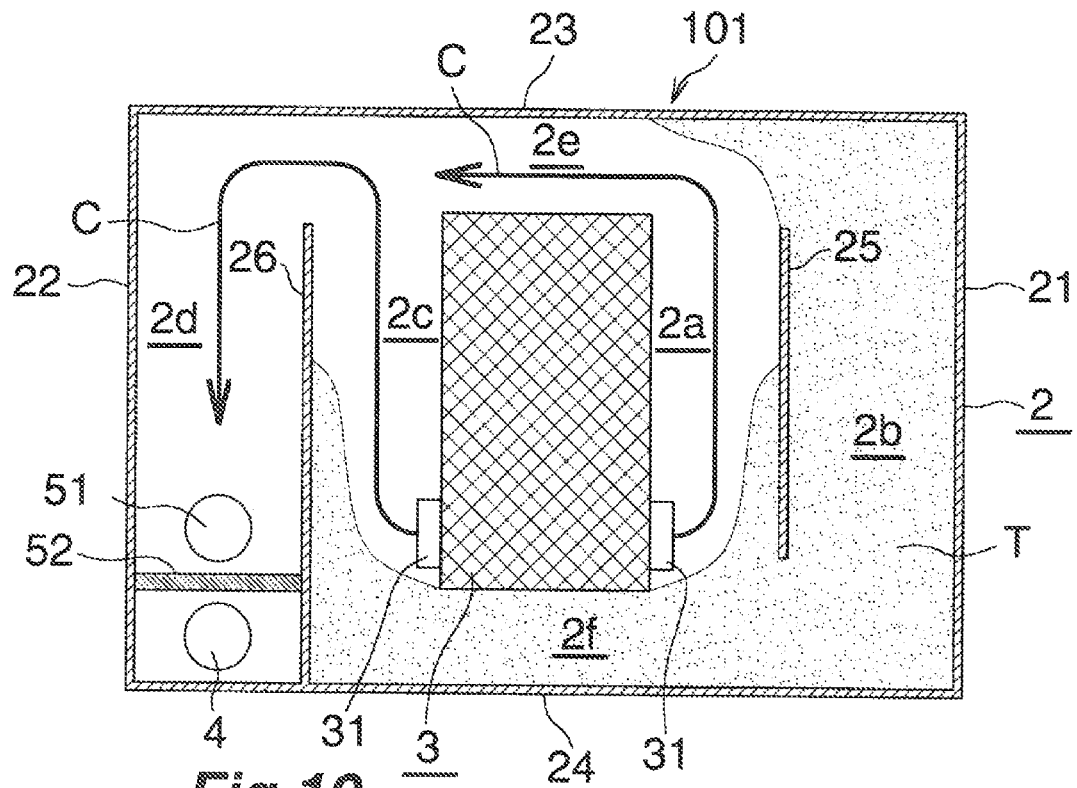
FIG. 10 is a horizontal cross-sectional view illustrating a cutting fluid tank of the related art.

A cutting fluid tank illustrated in these drawings have the same structure as the cutting fluid tank of the related art illustrated in FIG. 10 except for the structure relating to a variable flow restricting device which will be described below, and thus the same parts are denoted by the same reference numerals, and overlapped description will be omitted.

As illustrated in FIG. 1 to FIG. 3, a cutting fluid tank (1A) of the first embodiment includes three variable partitioning members (6A), (6B) and (6C) in an interior of a tank body (2) as a variable flow restricting device.

Each of the variable partitioning members (6A), (6B) and (6C) has a vertical plate shape, and is pivotable about a vertical rotational axis (61) passing through a center portion of the lateral width thereof.

The first variable partitioning member (6A) is arranged between a rear end of a right partitioning wall (25) and a rear side wall (24) so as to partition the right outer area (2b) and the rear area (2f) so as to be openable and closable.

The second variable partitioning member (6B) is arranged in a lengthwise intermediate portion in a fore-and-aft direction of the right inner area (2a), and configured to partition the interior of the right inner area (2a) so as to be openable and closable in the fore-and-aft direction.

The third variable partitioning member (6C) is arranged in a lengthwise intermediate portion in the fore-and-aft direction of the left inner area (2c), and configured to partition the interior of the left inner area (2c) so as to be openable and closable in the fore-and-aft direction.

Each of the variable partitioning members (6A), (6B) and (6C) is brought into reciprocating pivotal motion within a pivotal angle of 90 degrees, and may be pivoted by 90 degrees in a certain direction.

Drive sources for pivoting the variable partitioning members (6A), (6B) and (6C) are not specifically limited. However, for example, external drive sources such as a motor may be used. Among others, an operation cost may be saved and hence a cost efficient configuration is achieved by using a hydraulic motor operated by a flowing force of the cutting fluid supplied from the tank body (2) to the work portion of the machine tool by the cutting fluid supply pump (4) as the drive source.

Subsequently, a procedure of varying the flow channel of the cutting fluid containing chips in the interior of the tank body (2) with time, that is, a procedure of switching the flow channel at regular time intervals by the variable partitioning members (6A), (6B) and (6C) described above will be described.

Firstly, in a first mode of the cutting fluid tank (1A) illustrated in FIG. 1, the first variable partitioning member (6A) is at a closed position facing the fore-and-aft direction so as to be aligned in a line with the right partitioning wall (25) and partitions between the right outer area (2b) and the rear area (2f). The second variable partitioning member (6B) is at a closed position facing the left and right directions so as to be orthogonal to the right partitioning wall (25) and partitioning the interior of the right inner area (2a) in the fore-and-aft direction. The third variable partitioning member (6C) is at an opened position facing the fore-and-aft direction so as to be parallel to the left partitioning wall (26) and opening the left inner area (2b).

In the first mode, when the cutting fluid containing chips flows from the left and right flow-out ports (31) of the chip conveyor (3) into the interior of the tank body (2), most part of cutting fluid (C) flows from the rear area (2f) through the left inner area (2c) and the left side portion of the front area (2e) into the left outer area (2d), and after chips have been separated and removed by the chip separating apparatus (51) and the filter (52), is supplied again to the work chamber of machine tool by the cutting fluid supply pump (4).

Therefore, the flow velocity of the cutting fluid containing chips is lowered or is held down in most part of the right inner area (2a), the right outer area (2b), and the right side portion in the front area (2e), and hence chips (T) deposit and accumulate on the bottom portion of these areas (2a), (2b), and (2e).

FIG. 2 illustrates a second mode of the cutting fluid tank (1A). The second mode is a mode in which the second variable partitioning member (6B) and the third variable partitioning member (6C) are pivoted by 90 degrees from the first mode illustrated in FIG. 1.

In other words, the second variable partitioning member (6B) is pivoted to the opened position facing the fore-and-aft direction so as to be parallel to the right partitioning wall (25) and opening the right inner area (2a), and then the third variable partitioning member (6C) is pivoted to the closed position facing the left and right directions so as to be orthogonal to the left partitioning wall (26) and partitioning the interior of the left inner area (2c) in the fore-and-aft direction.

In this second mode, most part of the cutting fluid (C) containing chips flows from the rear area (2f) through the right inner area (2a) and the front area (2e) to the left outer area (2d). Therefore, the chips accumulated in the right inner area (2a) and the front area (2e) in the first mode are washed away and are separated and removed from the cutting fluid by the chip separating apparatus (51) and the filter (52) in the left outer area (2d).

FIG. 3 illustrates a third mode of the cutting fluid tank (1A). The third mode is a mode in which the first variable partitioning member (6A) and the second variable partitioning member (6B) are pivoted by 90 degrees from the second mode illustrated in FIG. 2.

In other words, the first variable partitioning member (6A) is pivoted to the opened position facing the left and right directions at a right angle to the right partitioning wall (25) and opening a portion between the right outer area (2b) and the rear area (2f), and then the second variable partitioning member (6B) is pivoted to the closed position facing the left and right directions so as to be orthogonal to the right partitioning wall (25) and partitioning the interior of the right inner area (2a) in the fore-and-aft direction.

In this third mode, most part of the cutting fluid (C) containing chips flows from the rear area (2f) through the right outer area (2b) and the front area (2e) to the left outer area (2d). Therefore, the chips accumulated in the right outer area (2b) and the front area (2e) in the first mode and the second mode are washed away and are separated and removed from the cutting fluid by the chip separating apparatus (51) and the filter (52) in the left outer area (2d).

By repeating these three modes at predetermined intervals, a position in which chips remaining accumulated is not generated in the interior of the tank body (2), and almost the entire quantity of the chips flowed into the tank body (2) are carried to the chip separating apparatus (51) and the filter (52) with the flow of the cutting fluid, and is separated and removed from the cutting fluid here.

Therefore, according to the cutting fluid tank (1A) of the embodiment, a burden of the maintenance such as cleaning in the interior of the tank body (2) is avoided, and the effective capacity of the tank body (2) is not lowered.

Second Embodiment

Figure 4:
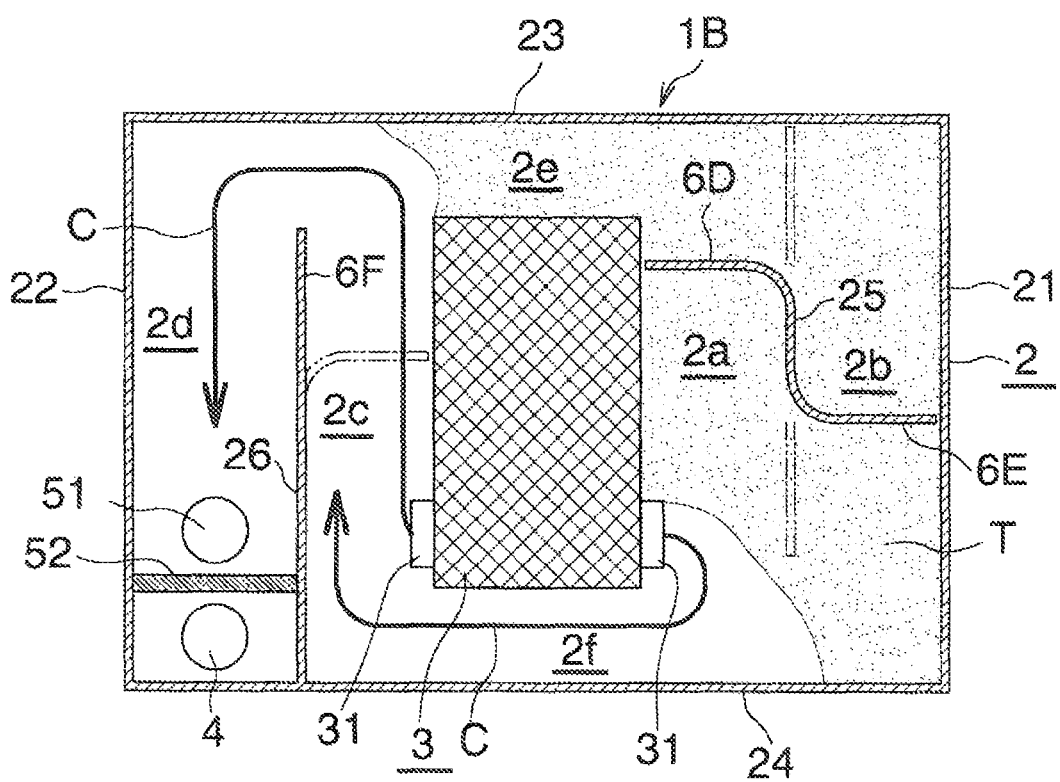
FIG. 4 is a horizontal cross-sectional view illustrating a first mode of the cutting fluid tank of a second embodiment of the invention.
Figure 5:
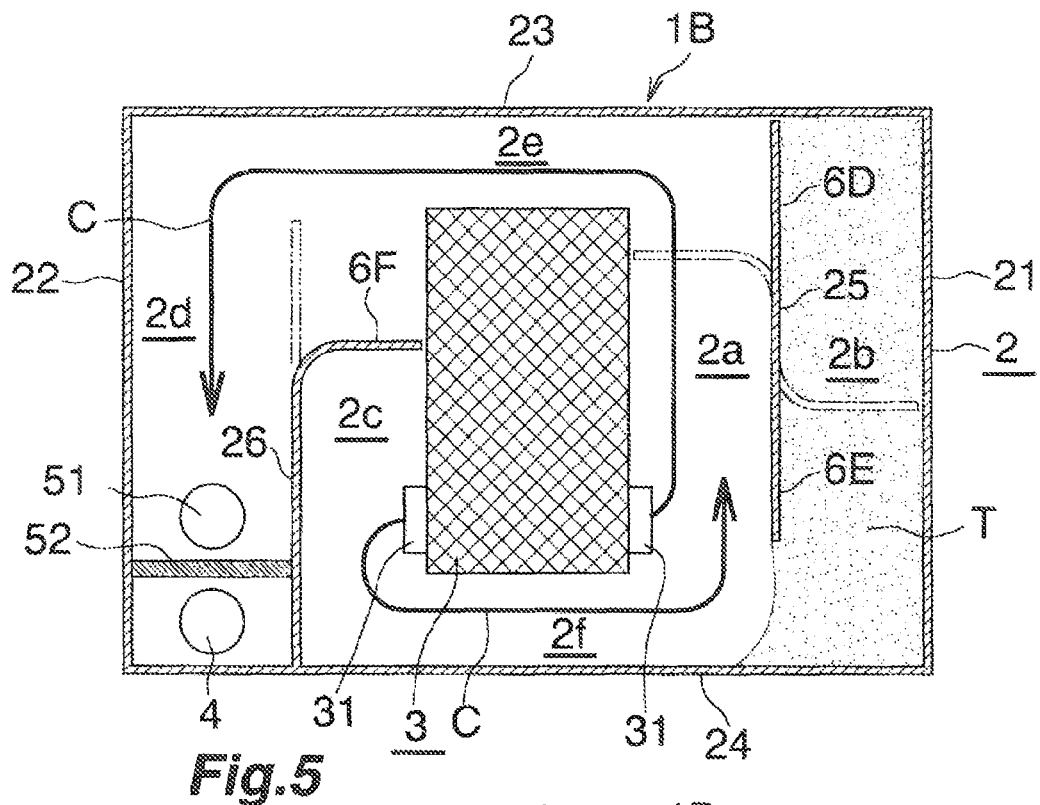
FIG. 5 is a horizontal cross-sectional view illustrating a second mode of the cutting fluid tank.
Figure 6:
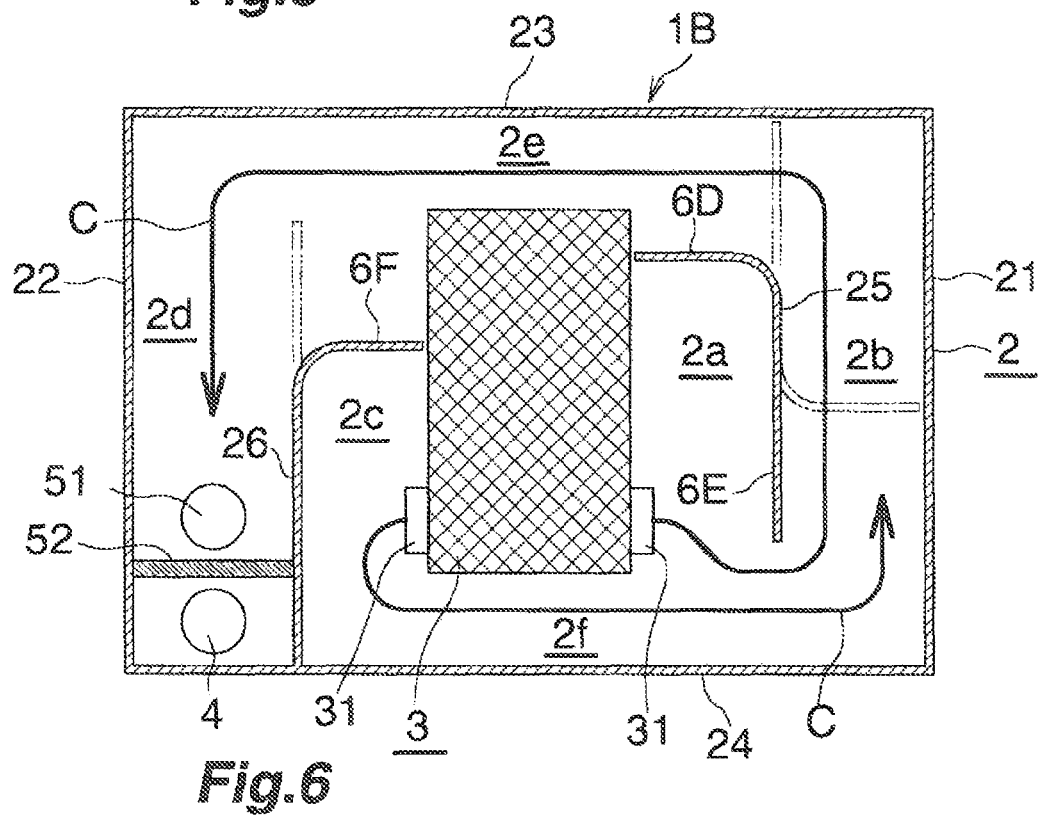
FIG. 6 is a horizontal cross-sectional view illustrating a third mode of the cutting fluid tank.

FIG. 4 to FIG. 6 illustrate a second embodiment of the invention.

A cutting fluid tank illustrated in these drawings have the same structure as the cutting fluid tank of the related art illustrated in FIG. 10 except for the structure relating to a variable flow restricting device which will be described below as well, and thus the same parts are denoted by the same reference numerals, and overlapped description will be omitted.

As illustrated in FIG. 4 to FIG. 6, a cutting fluid tank (1B) of the second embodiment includes three variable partitioning members (6D), (6E), and (6F) in an interior of a tank body (2) as a variable flow restricting device.

The variable partitioning members (6D), (6E), and (6F) are formed partly or entirely of a rubber elastic member.

Specifically, the first variable partitioning member (6D) is a vertical plate-shaped member formed so as to continue from a front end of a right partitioning wall (25), and the entire part thereof or a coupling portion with respect to the right partitioning wall (25) is formed of a rubber elastic member such as elastomer or rubber, for example. The first variable partitioning member (6D) extends forward so as to be aligned in a line with the right partitioning wall (25) and a distal end thereof is in proximity to or in contact with an inner surface of a front side wall (23) to partition between a right outer area (2b) and a front area (2e) in a state of not receiving an external force and not being elastically deformed. The first variable partitioning member (6D) can be elastically deformed so that the distal end thereof comes to the proximity to or into contact with a right side surface of a chip conveyor (3) by being bent to the left by approximately 90 degrees and, in this state, a portion between a right inner area (2a) and the front area (2e) is partitioned.

The second variable partitioning member (6E) is a vertical plate-shaped member formed so as to continue from a rear end of the right partitioning wall (25), and the entire part thereof or a coupling portion with respect to the right partitioning wall (25) is formed of a rubber elastic member such as elastomer or rubber, for example. The second variable partitioning member (6E) extends rearward so as to be aligned in a line with the right partitioning wall (25) in a state of not receiving an external force and not being elastically deformed. In this state, a space is provided between a distal end of the second variable partitioning member (6E) and a rear side wall (24). The second variable partitioning member (6E) can be elastically deformed so that the distal end thereof comes to the proximity to or into contact with an inner surface of a right side wall (21) by being bent to the right by approximately 90 degrees and, in this state, a portion between a right outer area (2b) and a rear area (2f) is partitioned.

The third variable partitioning member (6F) is a vertical plate-shaped member formed so as to continue from a front end of the left partitioning wall (26), and the entire part thereof or a coupling portion with respect to the left partitioning wall (26) is formed of a rubber elastic member such as elastomer or rubber, for example. The third variable partitioning member (6F) extends forward so as to be aligned in a line with the left partitioning wall (26) in a state of not receiving an external force and not being elastically deformed. In this state, a space is provided between the distal end of the third variable partitioning member (6F) and the front side wall (23). The third variable partitioning member (6F) can be elastically deformed so that the distal end thereof comes to the proximity to or into contact with a left side surface of the chip conveyor (3) by being bent to the right by approximately 90 degrees and, in this state, a portion between a left inner area (2c) and the front area (2e) is partitioned.

The device for elastically deforming the variable partitioning members (6D), (6E), and (6F) is not specifically limited and, for example, an external drive source provided with a fluid pressure cylinder may be used.

Subsequently, a procedure of varying the flow channel of the cutting fluid containing chips in the interior of the tank body (2) with time, that is, a procedure of switching the flow channel at predetermined time intervals by the variable partitioning members (6D), (6E) and (6F) described above will be described.

Firstly, in a first mode of the cutting fluid tank (1B) illustrated in FIG. 4, the first variable partitioning member (6D) is elastically deformed so as to be bent to the left by 90 degrees, and is at a first closed position partitioning between the right inner area (2a) and the front area (2e). The second variable partitioning member (6E) is elastically deformed to the right so as to be bent by 90 degrees, and at a closed position partitioning between the right outer area (2b) and the rear area (2f). The third variable partitioning member (6F) extends in the fore-and-aft direction so as to be aligned in a line with the left partitioning wall (26) without receiving an external force, and is at an opened position opening a portion between the left inner area (2c) and the front area (2e).

In this state, when the cutting fluid containing the chips flows from the left and right flow-out ports (31) of the chip conveyor (3) into the interior of the tank body (2), most part of the cutting fluid (C) flows from the rear area (2f) into the left outer area (2d) via the left inner area (2c).

Therefore, the chips are not accumulated in the rear area (2f) and the left inner area (2c), and the chips are separated and removed from the cutting fluid by the chip separating apparatus (51) and the filter (52) in the left outer area (2d).

In contrast, the flow velocity of the cutting fluid containing chips is lowered or is held down in most part of the right inner area (2a), the right outer area (2b), and the right side portion in the front area (2e), and hence chips (T) deposit and accumulate on the bottom portion of these areas (2a), (2b), and (2e).

FIG. 5 illustrates a second mode of the cutting fluid tank (1B). In the second mode, the first to the third variable partitioning members (6D), (6E), and (6F) are elastically deformed or restored and are displaced so as to pivot by 90 degrees from the first mode illustrated in FIG. 4.

In other words, the first variable partitioning member (6D) is elastically restored and thus is displaced to a second closed position facing the front so as to be aligned in a line with the right partitioning wall (25) and partitioning between the right outer area (2b) and the front area (2e). The second variable partitioning member (6E) is also elastically restored and thus is displaced to an opened position facing the rear so as to be aligned in a line with the right partitioning wall (25) and opening between the right outer area (2b) and the rear area (2f). The third variable partitioning member (6F) is elastically deformed to the right so as to be bent by 90 degrees, and is displaced at a closed position partitioning between the left inner area (2c) and the front area (2e).

In this second mode, most part of the cutting fluid (C) containing chips flows from the rear area (2f) through the right inner area (2a) and the front area (2e) to the left outer area (2d). Therefore, the chips accumulated in the right inner area (2a) and the front area (2e) in the first mode are washed away and are separated and removed from the cutting fluid by the chip separating apparatus (51) and the filter (52) in the left outer area (2d).

FIG. 6 illustrates a third mode of the cutting fluid tank (1B). In the third mode, the first variable partitioning member (6D) elastically deformed from the second mode illustrated in FIG. 5, and is displaced by being rotated by 90 degrees.

In other words, the first variable partitioning member (6D) is elastically deformed to the left so as to be bent by 90 degrees, and is displaced to the first closed position partitioning the right inner area (2a) and the front area (2e).

In this third mode, most part of the cutting fluid (C) containing chips flows from the rear area (2f) through the right outer area (2b) and the front area (2e) to the left outer area (2d). Therefore, chips (T) accumulated in a right end portion of the rear area (2f), the right outer area (2b) and a right end portion of the front area (2e) in the first and the second modes are washed away and are separated and removed from the cutting fluid by the chip separating apparatus (51) and the filter (52) in the left outer area (2d).

By repeating these three modes at predetermined intervals, a position in which chips remaining accumulated is not generated in the interior of the tank body (2), and almost the entire quantity of the chips flowed into the tank body (2) are carried to the chip separating apparatus (51) and the filter (52) with the flow of the cutting fluid, and is separated and removed from the cutting fluid here.

Therefore, in the cutting fluid tank (1B) of the embodiment as well, a burden of the maintenance such as cleaning in the interior of the tank body (2) is avoided, and the effective capacity of the tank body is not lowered.

The elastic member is not limited to rubber, and a thin-plate shaped member formed of a resin such as plastic or metal may be used.

Third Embodiment

Figure 7:
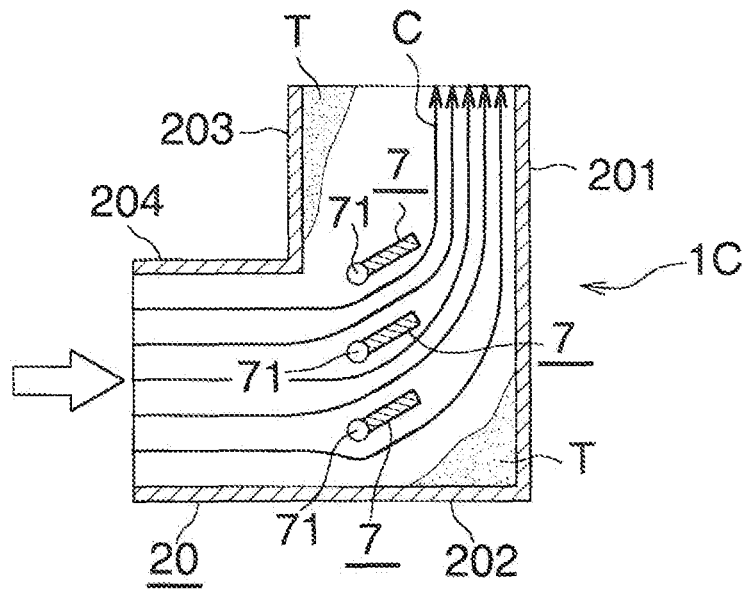
FIG. 7 is a horizontal cross-sectional view illustrating a first mode of a corner portion of a cutting fluid tank of a third embodiment of the invention.
Figure 8:
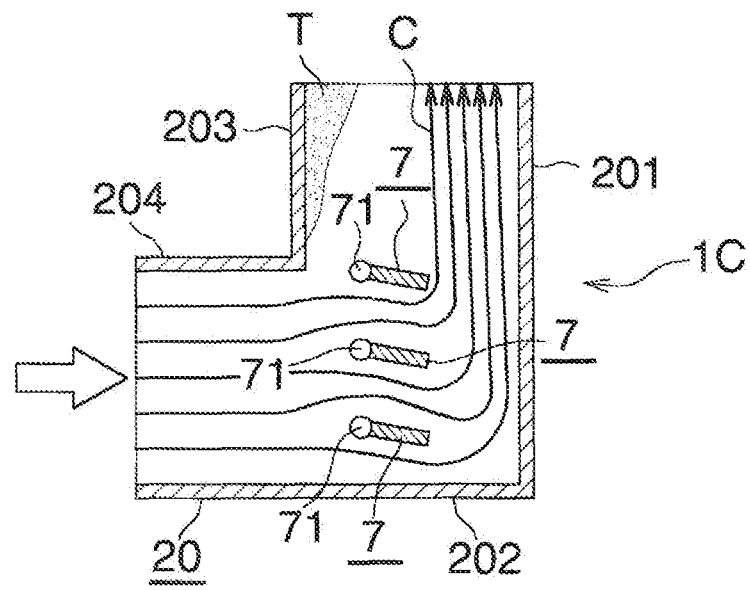
FIG. 8 is a horizontal cross-sectional view illustrating a second mode of the corner portion of the cutting fluid tank.
Figure 9:
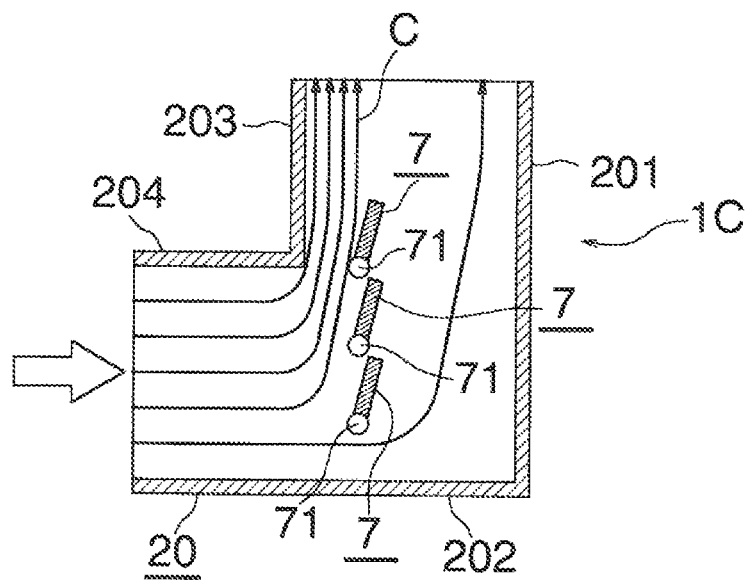
FIG. 9 is a horizontal cross-sectional view illustrating a third mode of the corner portion of the cutting fluid tank.

FIG. 7 to FIG. 9 illustrate a third embodiment of the invention.

Figure 11:
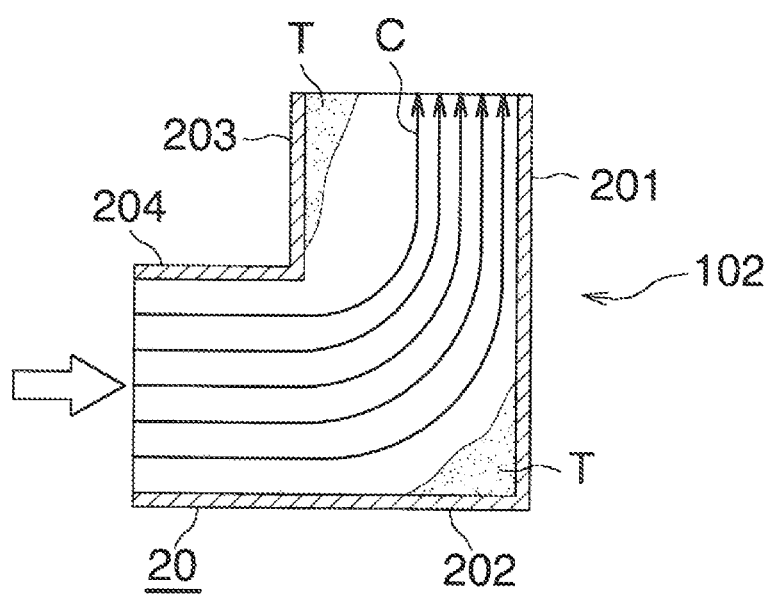
FIG. 11 is a horizontal cross-sectional view illustrating a corner portion of another cutting fluid tank of the related art.

A cutting fluid tank (1C) illustrated in these drawings have the same structure as the cutting fluid tank (102) of the related art illustrated in FIG. 11 except for the structure relating to a variable flow restricting device which will be described below, and thus the same parts are denoted by the same reference numerals, and overlapped description will be omitted.

As illustrated in FIG. 7 to FIG. 9, the cutting fluid tank (1C) of the third embodiment includes a variable flow introduction member (7) at a right rear corner portion in an interior of a tank body (20) as a variable flow restricting device.

The variable flow introduction member (7) is a vertical plate-strip-shaped member, and is swingable about a vertical axis (71) along one of vertical side portions. The variable flow introduction member (7) is provided so that a distal end thereof is directed downstream of a flow channel (from the substantially right side to the front side in FIGS. 7 to 9).

At least one variable flow introduction member (7) is sufficient. However, the illustrated configuration includes three variable flow introduction members (7) arranged at a distance in a fore-and-aft direction.

A swinging angle of the variable flow introduction member (7) is not specifically limited, and if an angle of the corner portion of the flow channel is 90 degrees as illustrated in FIG. 7 to FIG. 9, for example, the swinging angle may be set to on the order of 90 degrees correspondingly.

A drive source for swinging the variable partitioning member (7) is not specifically limited. However, for example, external drive sources such as a motor may be used. Among others, an operation cost may be saved and a cost efficient configuration is achieved by using a hydraulic motor operated by a flowing force of the cutting fluid supplied from the tank body (20) to a work portion of a machine tool by a cutting fluid supply pump as the drive source.

Subsequently, a procedure of varying the direction of flow of the cutting fluid containing chips at the right rear corner portion in the interior of the tank body (20) with time by the variable flow introduction members (7) described above will be described.

Firstly, in a first mode of the cutting fluid tank (1C) illustrated in FIG. 7, the variable flow introduction members (7) are at a swinging position in which the distal ends thereof are directed obliquely toward the right front.

In the first mode, when the cutting fluid containing chips flows at the right rear corner portion in the interior of the tank body (20), most part of the cutting fluid (C) is introduced obliquely toward the right front by the variable flow introduction members (7). Therefore, in the same manner as the case of the related art illustrated in FIG. 11, at a corner portion between the right side wall (201) and a rear side wall (202) and at a portion along a right partitioning wall (203), the flow of the cutting fluid becomes slow, so that the chips may accumulate on a bottom portion of such a point.

FIG. 8 illustrates a second mode of the cutting fluid tank (1C). In the second mode, the variable flow introduction members (7) are swung so that the distal ends thereof are directed substantially rightward from the first mode illustrated in FIG. 7.

In the second mode, since the most part of the cutting fluid (C) containing chips is introduced by the variable flow introduction members (7) and flows rightward, the chips accumulated at the corner portion between the right side wall (201) and the rear side wall (202) in the first mode are washed out by that flow.

FIG. 9 illustrates a third mode of the cutting fluid tank (1C). In the third mode, the variable flow introduction members (7) are swung so that the distal ends thereof are directed substantially forward from the second mode illustrated in FIG. 8.

In the third mode, since a large part of the cutting fluid (C) containing chips is introduced by the variable flow introduction members (7) and flows forward, the chips accumulated at a portion along the right partitioning wall (203) in the first and second modes are washed out by that flow.

By repeating these three modes at predetermined intervals, a position in which chips remaining accumulated is not generated at the right rear corner portion in the interior of the tank body (20), and almost the entire quantity of the chips contained in the cutting fluid and flowed in the same portion are carried downstream side and are separated and removed from the cutting fluid by a chip separating apparatus and a filter.

Therefore, according to the cutting fluid tank (1C) of the third embodiment, since accumulation of chips at the corner portion in the interior of the tank body (20) can be effectively prevented, a burden of the maintenance such as cleaning is alleviated, and the effective capacity of the tank body is not lowered.

What is claimed is:

1. A cutting fluid tank comprising:
   a tank body having stored therein cutting fluid containing chips, the cutting fluid containing the chips discharged from a work portion of a machine tool and flowed into an interior of the tank body at a predetermined inflow position;
   a cutting fluid supply device provided in the interior of the tank body and configured to supply the cutting fluid in the interior of the tank body toward the work portion of the machine tool; a variable flow channel configured for a flow of cutting fluid containing chips, wherein the flow has a velocity that makes the chips preventable from accumulating on a bottom portion of the tank body; and
   a variable flow restricting device provided in the interior of the tank body and configured to restrict a flow of the cutting fluid containing the chips from the inflow position to the cutting fluid supply device and to be capable of varying at least one of a direction and a position of the variable flow restricting device with time, the variable flow restricting device configured to be capable of varying the area of the variable flow channel with time.

2. The cutting fluid tank according to claim 1, wherein the variable flow restricting device includes a variable partitioning member that constitutes at least part of partitioning which defines a flow channel of the cutting fluid containing the chips in the interior of the tank body.

3. The cutting fluid tank according to claim 2, wherein the variable partitioning member is configured to be capable of pivoting or swinging, and the flow channel of the cutting fluid containing the chips is varied in association with the pivoting or the swinging of the variable partitioning member.

4. The cutting fluid tank according to claim 2, wherein the variable partitioning member is capable of performing reciprocatory motion in a predetermined direction, and the flow channel of the cutting fluid containing the chips is varied in association with the reciprocatory motion of the variable partitioning member.

5. The cutting fluid tank according to claim 2, wherein the variable partitioning member is elastically deformable by being formed at least partly of an elastic member, and the flow channel of the cutting fluid containing the chips is varied in association with the elastic deformation and restoration of the variable partitioning member.

6. The cutting fluid tank according to claim 1, wherein the variable flow restricting device includes a variable flow introducing member that introduces the flow of the cutting fluid containing the chips in the interior of the tank body, and is capable of varying at least one of the direction and the position with time.

7. The cutting fluid tank according to claim 6, the variable flow introducing member is provided at a corner portion in the interior of the cutting fluid tank.

8. The cutting fluid tank according to claim 7, wherein the variable flow introducing member is configured to be capable of pivoting or swinging, and the direction of flow of the cutting fluid containing the chips is varied in association with the pivoting or the swinging of the variable flow introducing member.

9. The cutting fluid tank according to claim 6, wherein the variable flow introducing member is configured to be capable of pivoting or swinging, and the direction of flow of the cutting fluid containing the chips is varied in association with the pivoting or the swinging of the variable flow introducing member.

10. The cutting fluid tank according to claim 1, wherein the variation of at least one of the direction and the position of the variable flow restricting device is performed continuously or intermittently during an operation of the machine tool.

11. The cutting fluid tank according to claim 1, wherein the variation of at least one of the direction and the position of the variable flow restricting device is performed by a drive force of a hydraulic motor configured to be operated by a flowing force of the cutting fluid supplied from the tank body to the work portion by a cutting fluid supply device.

* * * * *